United States Patent
Bussema et al.

(10) Patent No.: US 9,820,472 B2
(45) Date of Patent: Nov. 21, 2017

(54) POULTRY CAGE WITH IMPROVED MANURE DRYING ARRANGEMENT

(71) Applicant: BIG DUTCHMAN INTERNATIONAL GMBH, Vechta (DE)

(72) Inventors: John Bussema, Holland, MI (US); Günter Möller, Essen (DE)

(73) Assignee: BIG DUTCHMAN INTERNATIONAL GmbH, Vechta (DE)

( * ) Notice: Subject to any disclaimer, the term of this patent is extended or adjusted under 35 U.S.C. 154(b) by 523 days.

(21) Appl. No.: 14/203,781

(22) Filed: Mar. 11, 2014

(65) Prior Publication Data
US 2015/0208617 A1    Jul. 30, 2015

(30) Foreign Application Priority Data
Jan. 24, 2014   (DE) .................... 20 2014 000 575 U (51) Int. Cl.
*A01K 31/18* (2006.01)
*A01K 31/04* (2006.01)
(Continued)

(52) U.S. Cl.
CPC .............. *A01K 31/002* (2013.01); *A01K 1/01* (2013.01); *A01K 31/04* (2013.01); *F26B 21/004* (2013.01)

(58) Field of Classification Search
USPC ....... 119/479, 436, 437, 442, 443, 439, 438, 119/447, 450, 480, 487, 509, 525, 527,
(Continued)

(56) References Cited

U.S. PATENT DOCUMENTS 3,385,266 A * 5/1968 Launder ................. A01K 31/04
119/442
4,050,163 A * 9/1977 Short ...................... F26B 9/103
34/175
(Continued)

FOREIGN PATENT DOCUMENTS

DE       19634126    * 2/1997  ............. A01K 31/04
EP        0108230    * 5/1984  ............. A01K 31/04
(Continued)

OTHER PUBLICATIONS

Partial Drying of Poultry Manure using In-House Air, Bulletin 633T, Rainer A. von Oheimb et al, West Virginia University Agricultural Experiment Station, Sep. 1974, 22 pages, [retrieved from internet Jun. 6, 2016 http://www.archive.org/detailsdryingofp633ohei].*

*Primary Examiner* — Andrea Valenti
(74) *Attorney, Agent, or Firm* — Price Heneveld LLP (57) ABSTRACT

A poultry cage comprises a resting surface in a horizontal plane having a plurality of openings, a manure collecting surface arranged underneath the resting surface, and a drying air channel comprising a first side wall having a set of first openings for directing drying air towards the manure collecting surface and a set of second openings for directing drying air towards the manure collecting surface. Each first opening directs the drying air at a first angle against a vertical direction towards the manure collecting surface and each second opening directs the drying air at a second angle against a vertical direction towards the manure collecting surface, wherein the first angle being different than the second angle.

14 Claims, 4 Drawing Sheets

(51) Int. Cl.
*A01K 31/00* (2006.01)
*A01K 1/01* (2006.01)
*F26B 21/00* (2006.01)

(58) Field of Classification Search
USPC .................................................. 119/448, 528
See application file for complete search history.

(56) References Cited

U.S. PATENT DOCUMENTS

| | | | | |
|---|---|---|---|---|
| 4,561,419 A | * | 12/1985 | Koziol | A47J 37/0682 |
| | | | | 126/39 E |
| 5,596,818 A | * | 1/1997 | Jones | B60S 3/002 |
| | | | | 134/57 R |
| 5,666,905 A | * | 9/1997 | Mackin | A01K 1/0047 |
| | | | | 119/448 |
| 5,737,850 A | * | 4/1998 | Hendrix | A01K 31/04 |
| | | | | 119/442 |
| 8,182,593 B2 | * | 5/2012 | Rapp | B01D 53/58 |
| | | | | 119/436 |
| 8,514,045 B2 | * | 8/2013 | Sankar | H01F 7/021 |
| | | | | 335/302 |
| D691,418 S | * | 10/2013 | Minton | D7/399 |
| 9,441,884 B2 | * | 9/2016 | McCallum | F26B 9/02 |
| 2002/0100427 A1 | * | 8/2002 | Notenbomer | A01C 3/026 |
| | | | | 119/447 |
| 2003/0205205 A1 | * | 11/2003 | Opfel | A01K 1/0047 |
| | | | | 119/526 |
| 2004/0088878 A1 | * | 5/2004 | Langley | A45D 20/12 |
| | | | | 34/96 |
| 2011/0061601 A1 | * | 3/2011 | Correa | A01K 1/0029 |
| | | | | 119/437 |
| 2012/0055414 A1 | * | 3/2012 | Correa | A01K 1/0029 |
| | | | | 119/448 |
| 2014/0208607 A1 | * | 7/2014 | Navazo | F26B 21/004 |
| | | | | 34/487 |

FOREIGN PATENT DOCUMENTS

| | | | | |
|---|---|---|---|---|
| EP | 0498084 | * | 8/1992 | ........... A01K 1/0103 |
| GB | 2249263 A | * | 6/1992 | ............. A47K 10/48 |

* cited by examiner

POULTRY CAGE WITH IMPROVED MANURE DRYING ARRANGEMENT

CROSS-REFERENCE TO FOREIGN PRIORITY APPLICATION

The present application claims the benefit under 35 U.S.C. §119(b) of German Utility Model Application No. 20 2014 000 575.3, filed Jan. 24, 2014, entitled "Poultry Cage with Improved Manure Driving Arrangement," which disclosure is fully incorporated by reference.

FIELD OF THE INVENTION

The invention is directed to a poultry cage comprising a resting surface for poultry and a manure collecting surface which is arranged underneath said resting surface.

Such poultry cage arrangements are used for holding hens in a stable or the like. The basic advantage of such poultry cage arrangement is a rather hygienic condition which is achieved by a resting surface which is permeable to the manure of the hens by a plurality of openings. By this, the manure can fall down through the resting surface onto the manure collecting surface and thus is removed out of the area in which the hens rest.

A problem which is associated with such poultry cage arrangements is the production of ammonia and other gaseous substances out of the manure which is collected on the manure collecting surface. Further, bacteria, insects, or the like may grow up within said manure and provide a significant danger to the poultry and the environment or such cage arrangements. To prevent danger it is known to arrange a drying air channel in such a poultry cage arrangement. The drying air channel supplies drying air to the manure which is collected on said manure collecting surface and thus the manure shall dry quickly thus reducing the emission of hazardous gaseous substances and the growth of bacteria and insects or the like. Usually, such drying air channel is arranged on one or both sides of the manure collecting surface or preferably in the middle above such manure collecting surface. The air flows out of openings of said drying air channel onto the manure collecting surface to effect the drying of said manure.

A major problem related to such arrangements is an incomplete or slow drying process. This was found to be effected by the columns of manure which build up on such manure collecting surface due to the poultry having preferred sitting places on the said resting surface. Such preferred sitting places of the poultry might be caused, for example, by a perch or sitting pole arranged above said resting area. Another example for preferred sitting places is provided by the arrangement of the feeding and drinking equipment. Such columns cause accumulations of manure and hinder the drying air to reach all regions of the manure collecting surface. Thus, inside said columns and in flow direction behind said columns the manure is dried insufficiently and the risk of bacteria and insects growing up and the emission of hazardous gaseous substances is increased.

It is an object of the invention to overcome this problem.

SUMMARY OF THE INVENTION

The aforementioned problem is solved according to the invention by providing a resting surface in a horizontal plane, said resting surface having a plurality of openings, a manure collecting surface arranged underneath said resting surface, a drying air channel extending in a longitudinal direction, wherein said drying air channel comprises a top wall, a bottom wall and a first and a second side wall defining an inner space for conveying drying air wherein in said first side wall a set of first openings is present, said first openings directing drying air out of said inner space towards said manure collecting surface, wherein in said first side wall a set of second openings is present, said second openings directing drying air out of said inner space towards said manure collecting surface, wherein each first opening directs the drying air at a first angle against a vertical direction towards the manure collecting surface, wherein each second opening directs the drying air at a second angle against a vertical direction towards the manure collecting surface, wherein said first angle is different from that second angle.

According to a further aspect of the invention, the problem is solved by providing a resting surface in a horizontal plane, said resting surface having a plurality of openings, a manure collecting surface arranged underneath said resting surface, a drying air channel extending in a longitudinal direction, wherein said drying air channel comprises a top wall, a bottom wall and a first and a second side wall defining an inner space for conveying drying air wherein in said first side wall a set of first openings is present, said first openings directing drying air out of said inner space towards said manure collecting surface, wherein in said first side wall a set of second openings is present, said second openings directing drying air out of said inner space towards said manure collecting surface, wherein the set of first openings directs the drying air to a first surface region of said manure collecting surface, said first region comprising one or a plurality of surface sections arranged along a line extending in said longitudinal direction and being arranged in a first distance to the drying air channel, wherein the set of second openings directs the drying air to a second surface region of said manure collecting surface, said second region comprising one or a plurality of second surface sections arranged along a line extending in said longitudinal direction and being arranged in a second distance to the drying air channel, wherein said first distance is different from said second distance.

According to the invention a drying air channel is provided which has two or more different sets of openings for distributing the drying air onto the manure collecting surface. By this, it is not required to provide a single type of openings which spreads the air in an angle or range of angles over the manure collecting surface which is sufficient to cover the whole manure collecting surface and which is prone to being deflected by columns building up on said manure collecting surface. Instead, two or more focussed drying air flows are provided by a corresponding number of two or more sets of openings out of the drying air channel. By this, it is possible to cover a first region in a first distance from the drying air channel by a first set of openings and to cover a second region in a second distance from said drying air channel by a second set of openings. In the same way, it is possible to provide the drying air at a first angle or a first range of angles by a first set of openings and to provide the drying air at a second angle or second range of angles by a set of second openings onto the manure collecting surface. The angle or range of angles may be rather focussed in this application and thus effect a quick and complete drying of the manure collected on the manure collecting surface independent on the occurrence of columns of manure.

A main advantage of the invention is the effective drying of the manure independent on the building up of columns of the manure collecting surface by preserving the cost efficient manufacturing process of such drying air channels at the same time. It is to be noted that the drying air channel usually is manufactured by extruding a specific profile or two specific profiles which are coupled to each other to build the drying air channel. These profiles are perforated by a plurality of openings in a simple manufacturing process of stamping or drilling in such holes wherein the deflection of the surface into which the opening is drilled roughly defines the angle of flow of the drying air flowing though said opening. The need for such cost efficient manufacturing process usually does not allow to insert any specific means like nozzles or the like into such openings which might improve the flow of the drying air and the drying process here. It is to be understood that the angle at which the drying air flows out of the drying channel shall be defined to be an angle which is measure against a vertical direction.

According to a first preferred embodiments the drying air channel extends along the middle line of the poultry cage arrangement and the resting surface comprises a first surface portion arranged on one side of the drying air channel and a second surface portion arranged on another side of the drying air channel, the manure collecting surface comprises a first surface portion arranged on one side of the drying air channel and a second surface portion arranged on an other side of the drying air channel, respectively, and wherein in the said second side wall a set of first openings and a set of second openings is present which is arranged in the same way like the set of first and second openings in said first side wall.

According to this embodiment an efficient arrangement of the drying air channel inside the cage is provided with resting surfaces being arranged on both sides of the drying air channel with reference to the direction of extension of the channel. It is to be understood that the first and second surface portion of the resting surface may be connected with each other to define one resting surface comprising the two surface portions interconnected with each other in such a way that the animals can enter the second surface portion out of the first surface portion and vice versa. In the same way, the first and second surface portion of the manure collecting surface may be provided by one single manure collecting surface comprising the two surface portions. As an alternative hereto, separate manure collecting surface portions may be provided which are not connected to each other and are defined by a single component of each poultry cage.

It is further preferred that said drying air channel is arranged below said resting surface. According to this embodiment the animals may rest above the drying air channel and thus no space above said resting surface is occupied by the drying air channel and limits the space for the animals. In particular, the top end of the drying air channel may be flush with the resting surface in such a way that the outer surface of said top end forms a part of the resting surface.

It is further preferred that each of said first openings is arranged in a distance of less than four centimeter below said resting surface. A problem related to such openings in the drying air channel which are arranged below the resting surface is induced by dirt, manure and the like which may affect a clogging of said openings. This problem can be overcome by arranging the first openings in or below a certain distance from said resting surface. This specific arrangement will result in the claws of the animals frequently reaching through the resting surface right to the first openings and thus effecting a removal of such attachments of manure, dirt of the like in or around said first openings. By this, the animals frequently touch into the openings or close to the openings with their claws and thus remove any attachments which might induce clogging of said openings. Thus, a clogging of the openings is safely prevented by this self-cleaning effect.

It is further preferred that each of said first and second openings is arranged in a distance of less than four centimeter below said resting surface. By arranging both the first and the second openings in such a specific distance below said resting surface the self-cleaning effect is provided for both the first and the second openings and thus clogging of all openings is prevented hereby.

According to a further preferred embodiment said manure collecting surface is the upper face of a manure conveying belt extending in said longitudinal direction. By this embodiment, the manure which is collected on the manure collecting surface can be transported out of the region below the resting surface to a location where the manure is removed from the manure collecting surface. It is in particular preferred that the conveying direction of said conveying belt is parallel to the direction of extension of the drying air channel and thus the manure collected on the upper face of the manure conveying belt is dried along the whole conveying path parallel to the drying air channel. This arrangement usually allows an efficient drying and removal of the manure out of the region of the resting surface.

It is further preferred that said drying air channel is a hollow plastic profile member. Using such a plastic profile member allows an efficient manufacturing of the drying air channel, e.g. by extruding the air channel in one piece or in a two-piece arrangement. Further, by providing a plastic profile member any problems arising from corrosion or any other kind of chemical reaction or degradation can be avoided at said drying air channel which is in particular relevant if the drying air channel is arranged below the resting surface.

It is further preferred that said drying air channel has a cross section which has a first horizontal width in an upper portion and a second horizontal width in a lower portion, wherein said first horizontal width is larger than said second horizontal width. By providing the drying air channel with such a specific geometry of the cross-section attachments in the lower portion which arise from manure and dirt falling down from the resting surface arranged above the drying air channel can be avoided. It is to be understood that the sidewalls of the drying air channel may be arranged in a vertical direction or may be arranged in an inclined direction. Thus, the two different widths according to this embodiment may be provided by perpendicular wall sections which are separated by a stepwise reduction in width or may be provided by inclined side walls which define a greater width at the upper end than at the lower end of the side walls.

It is then further preferred that said second openings are arranged in said lower portion. By arranging the second openings in the lower part any clogging of said openings can be reduced or prevented in such a way that manure and dirt falling down from the resting surface are defected by the upper part of the drying air channel and thus cannot reach the second opening or can hardly reach the second openings.

It is further preferred that said first openings are arranged along a first line extending in said longitudinal direction. By arranging said first openings along a line, a significant improvement in manufacturing technique of these openings is achieved and an efficient and economic manufacturing can be reached. Further, the first openings are arranged for an effective drying of the manure along the whole length of the drying air channel which is in particular helpful if the manure collecting surface is provided by a conveyor belt and the manure thus is moved along the drying air channel having the line of first openings.

It is then further preferred that said second openings are arranged along a second line extending in said longitudinal direction, said second line being distanced from said first line. By arranging said second openings in such a specific way, the same advantages and effects are provided for the second openings like the ones which were described beforehand in relation to the first openings. Each two adjacent first openings may be arranged in a constant distance from each other, and each two second openings may be arranged in a constant distance from each other whereas the distance between each two first openings and between each two second openings may be identical. This significantly improves the efficiency of drying and the economical manufacturing process in which a further preferred embodiment is that an upper surface of said top wall forms a part of the resting surface. This allows an efficient geometrical set-up of the poultry cage and is in particular preferred if the resting surface comprises a first and a second portion which may be arranged on both sides of the drying air channel and are thus interconnected by the top surface of the drying air channel to allow the animals to reach the first portion of the resting surface out of the second portion of the resting surface and vice versa.

According to a further aspect of the invention a poultry cage is provided, comprising a resting surface in a horizontal plane, said resting surface having a plurality of openings, a manure collecting surface arranged underneath said resting surface, a drying air channel extending in a longitudinal direction, wherein said drying air channel comprises a top wall, a bottom wall and a first and a second side wall defining an inner space for conveying drying air wherein in said first side wall a set of first openings is present, said first openings directing drying air out of said inner space towards said manure collecting surface, wherein in said first side wall a set of second openings is present, said second openings directing drying air out of said inner space towards said manure collecting surface, wherein each first opening directs the drying air at a first angle against a vertical direction towards the manure collecting surface, wherein each second opening directs the drying air at a second angle against a vertical direction towards the manure collecting surface, wherein said first angle is different from that second angle, wherein said drying air channel is arranged below said resting surface, wherein each of said first openings is arranged in a distance of less than four centimeter below said resting surface, wherein said manure collecting surface is the upper face of a manure conveying belt extending in said longitudinal direction, wherein said drying air channel has a cross section which has a first horizontal width in an upper portion and a second horizontal width in a lower portion, wherein said first horizontal width is larger than said second horizontal width, wherein said second openings are arranged in said lower portion, wherein said first openings are arranged along a first line extending in said longitudinal direction, wherein said second openings are arranged along a second line extending in said longitudinal direction, said second line being distanced from said first line, and wherein an upper surface of said top wall forms a part of the resting surface.

According to a further aspect of the invention a poultry cage is provided, comprising a resting surface in a horizontal plane, said resting surface having a plurality of openings, a manure collecting surface arranged underneath said resting surface, a drying air channel extending in a longitudinal direction, wherein said drying air channel comprises a top wall, a bottom wall and a first and a second side wall defining an inner space for conveying drying air wherein in said first side wall a set of first openings is present, said first openings directing drying air out of said inner space towards said manure collecting surface, wherein in said first side wall a set of second openings is present, said second openings directing drying air out of said inner space towards said manure collecting surface, wherein the set of first openings directs the drying air to a first surface region of said manure collecting surface, said first region comprising one or a plurality of surface sections arranged along a line extending in said longitudinal direction and being arranged in a first distance to the drying air channel, wherein the set of second openings directs the drying air to a second surface region of said manure collecting surface, said second region comprising one or a plurality of second surface sections arranged along a line extending in said longitudinal direction and being arranged in a second distance to the drying air channel, wherein said first distance is different from said second distance, wherein said drying air channel is arranged below said resting surface, wherein each of said first openings is arranged in a distance of less than four centimeter below said resting surface, wherein said manure collecting surface is the upper face of a manure conveying belt extending in said longitudinal direction, wherein said drying air channel has a cross section which has a first horizontal width in an upper portion and a second horizontal width in a lower portion, wherein said first horizontal width is larger than said second horizontal width, wherein said second openings are arranged in said lower portion wherein said first openings are arranged along a first line extending in said longitudinal direction, wherein said second openings are arranged along a second line extending in said longitudinal direction, said second line being distanced from said first line, and wherein an upper surface of said top wall forms a part of the resting surface.

A further aspect of the invention is a poultry cage for hens, comprising a resting surface for the hens, said resting surface being permeable for manure of said hens, and a manure collecting band which is arranged below said resting surface, characterized by an air channel having a plurality of openings, wherein air is flowing out of the inner space of said air channel in the direction of the manure collecting band, wherein the openings comprise at least two sets of openings, each set having a plurality of openings and wherein the openings of one set are arranged in a first row and the openings of the second set are arranged in a second row which is positioned in a distance to the first row.

Said poultry cage may be further improved in such a way that the openings comprise at least two sets of openings, each of said sets comprising a plurality of openings and the openings of one of said sets define a flow direction in a first angle or angle range and the openings of said sets define a flow direction in a second angle or angle range which is different from said first angle or angle range, respectively.

According to a further preferred embodiment the poultry cage may be improved in such a way that the openings comprise at least two sets of openings, each set having a plurality of openings and the openings of one set of said sets is smaller than the openings of another set of said sets.

Still further, the poultry cage may be further improved in such a way that the openings comprise at least two sets of openings, each set having a plurality of openings and the openings of one set are distributed in a distance from each other which is identical for each two openings being adjacent to each other and the openings of another set are arranged in a distance from each other which is identical for each two openings adjacent to each other and the distance between the openings of the two sets is identical.

DETAILED DESCRIPTION OF THE PREFERRED EMBODIMENTS

Figure 1:
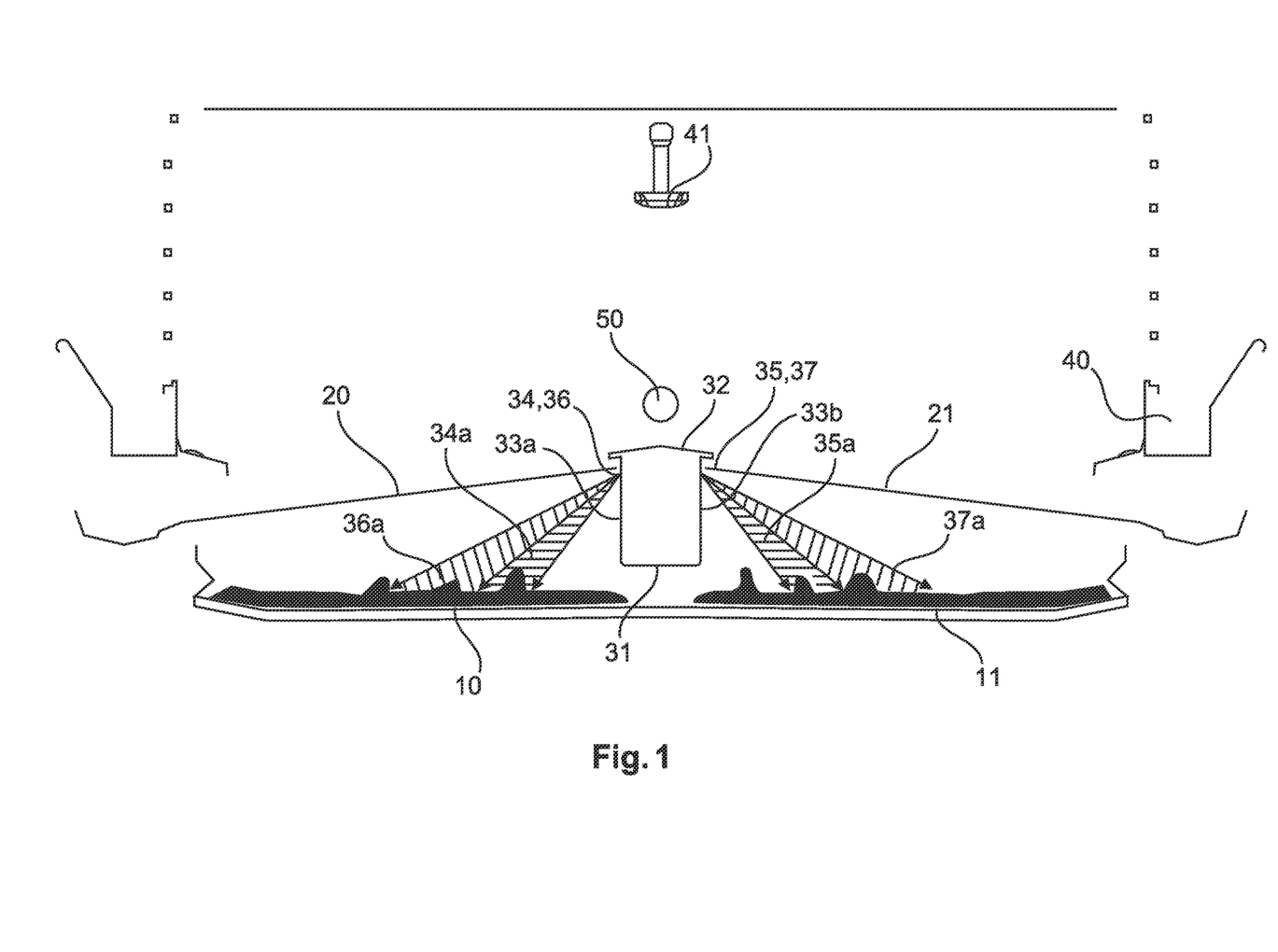
FIG. 1 shows a schematic cross section cage system according to a first preferred embodiment of the invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

As can be seen in FIG. 1, a cage system according to the invention comprises a level system which serves to the keeping and feeding of hens. The cage system comprises manure collecting surfaces 10, 11 at the bottom and resting surfaces 20, 21 at the top. A drying air channel 30 is provided in the middle between said manure collecting surface and said resting surface.

The manure collecting surfaces 10, 11 comprise two manure collecting belts at the bottom. The manure collecting belts are configured as endless conveyor belts and are moving with a slow constant conveying speed driven by a motor unit and controlled by a control unit both of which are not shown in the figures. The manure collecting belts preferably comprise a closed upper surface but may be perforated for bidirectional drying air flow in other embodiments.

An upper animal area is accessible to hens. In this upper animal area, facilities 40, 41 for the feeding of the hens, for example with food and liquids are comprised. The upper animal area comprises and is delimited downwards by resting surfaces 20, 21 comprising a manure permeable grid. The manure, which the animals dispose, falls through a grid onto the manure collecting belts which are placed underneath each of the resting surfaces.

To reduce the emission of gaseous substances and smell, dry air is directed over the wet manure collected on the manure collecting surfaces 10, 11. The dry air is supplied via the drying air channel 30 which extends along a longitudinal direction in parallel direction to the conveying direction of the manure collecting belts, which comprise the manure collecting surfaces 10, 11. The air channel defines an inner space which is delimited by a bottom wall 31, a top wall 32, and two side walls 33a, 33b.

A perch 50 is arranged above the drying air channel, wherein said perch 50 may be a preferred resting place of the hens and thus pillars of manure may build up on the manure collecting belts in a distinct distance from said perch 50, wherein said distance is defined by the anatomy of the hens sitting on the perch.

The drying air channel 30 is provided with openings 34, 36 and 35, 37 which may be stamped or drilled. As can be seen in FIG. 1, the openings 34, 36 and 35, 37 may be provided along a first straight line in the first side wall 33a and along a second straight line in the second side wall 33b. Each plurality of openings 34, 36 and 35, 37 along each line comprises openings which provide drying air at different flow direction angles, as can be seen from FIG. 1 showing two different flow directions 34a, 36a and 35a, 37a, e.g. covering a total range of angle of 20° to 30° on each side.

As can be seen from FIG. 1 showing a cross section of the air channel 30, the air is directed over the manure in a preset range of angles. As the angle of the air flow covers only a limited range, e.g., 20° to 30°, and therefore is rather small in comparison to the area to be dried, only a part of the manure collecting band is ventilated, while other parts of the band are only fractionally ventilated or not ventilated at all.

Figure 2:
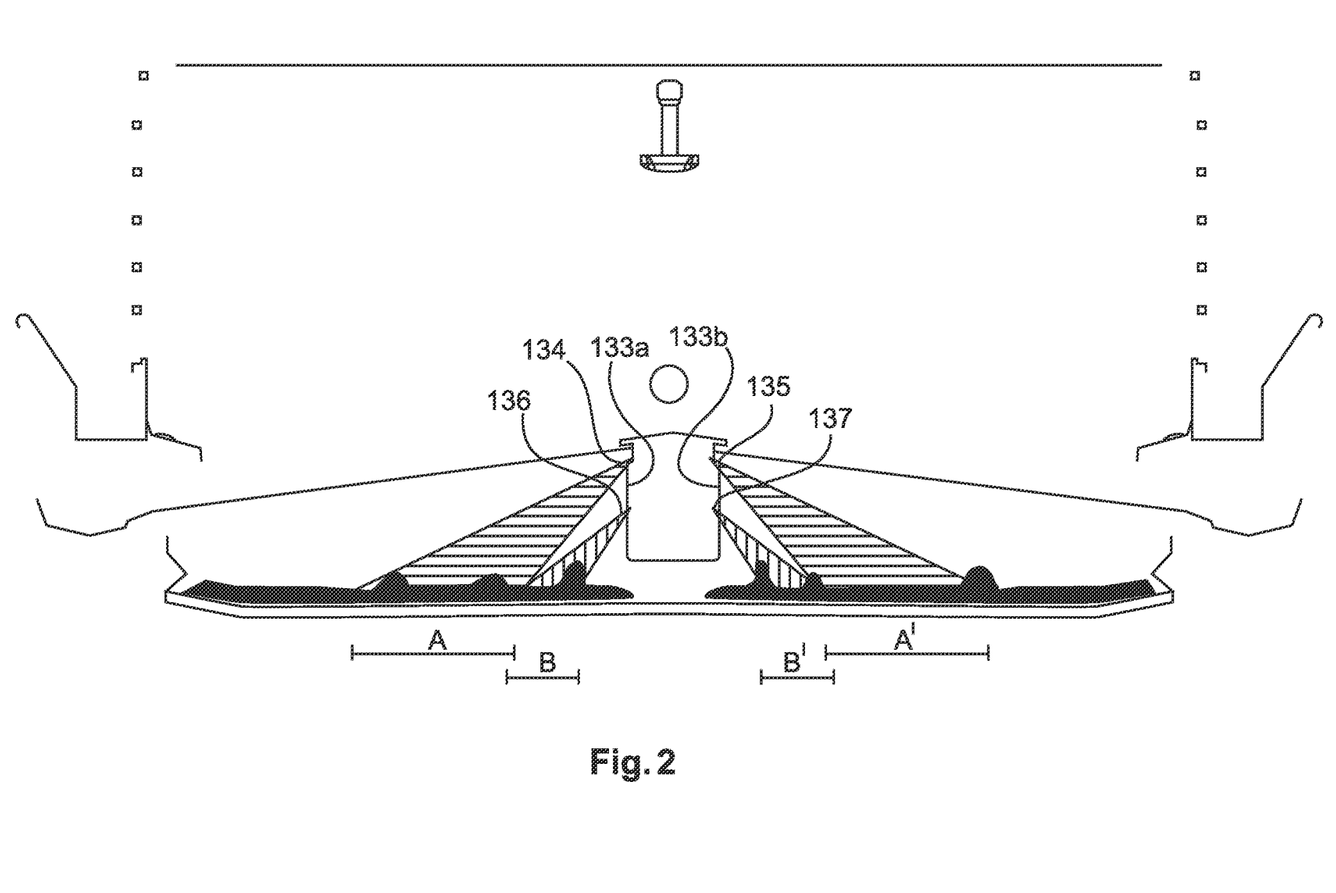
FIG. 2 shows a schematic cross section of a cage system according to a second preferred embodiment of the invention.

To reach the only fractionally or non-ventilated parts of the collecting band with dry air as well, dry air is preferably directed over the manure collecting band by one or a plurality of sets of openings which are positioned in different distances on the air channel 30, as shown in FIG. 2. In this embodiment, two lines of openings 134, 136 are provided in a first side wall 133a and two lines of openings 135, 137 are provided in a side wall 133b of a drying air channel 130. The openings 134, 135 in the upper line provide a drying air flow to an outer region A, A' of the manure collecting belt, whereas the openings 136, 137 in the lower line provide a drying air flow to an inner region B, B' of the manure collecting belt. In this embodiment, both sets of openings on both sides of the drying air channel have the same angle of flow direction.

Figure 3:
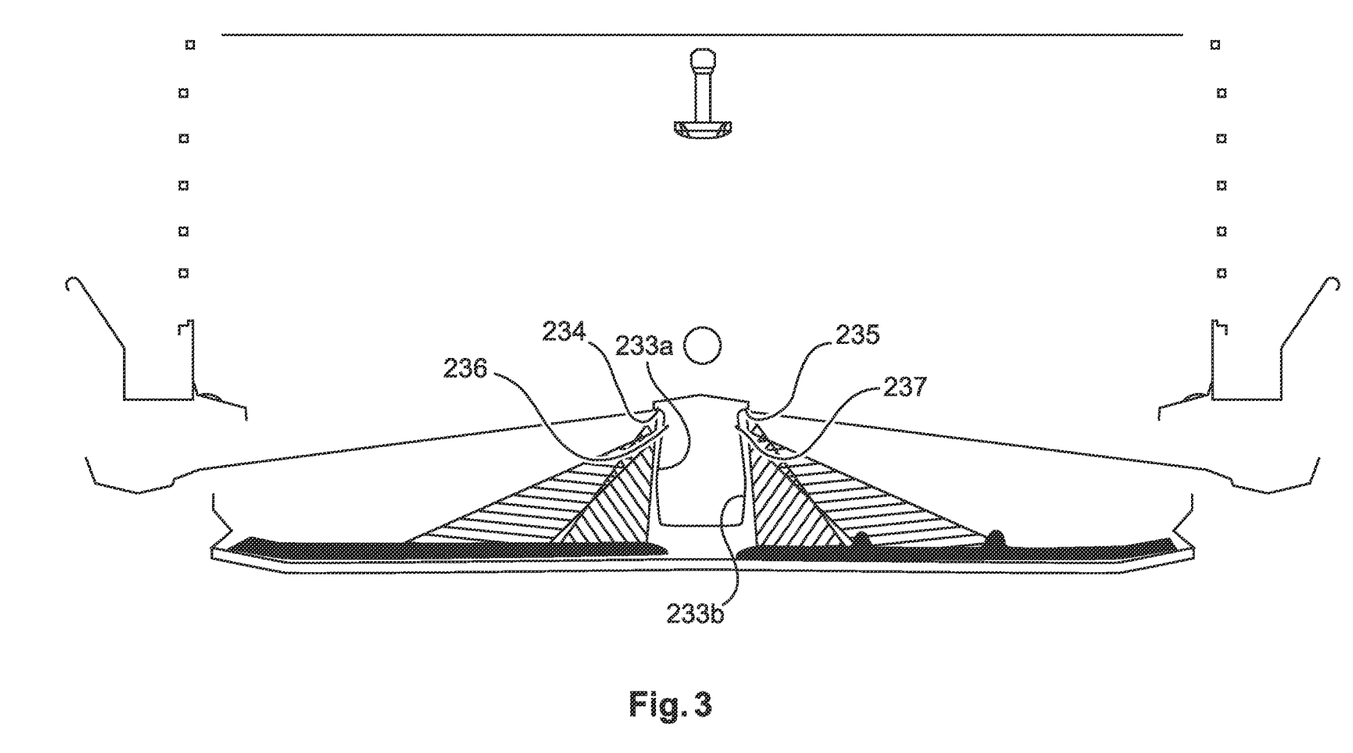
FIG. 3 shows a schematic cross section of a cage system according to a third preferred embodiment of the invention
Figure 4:
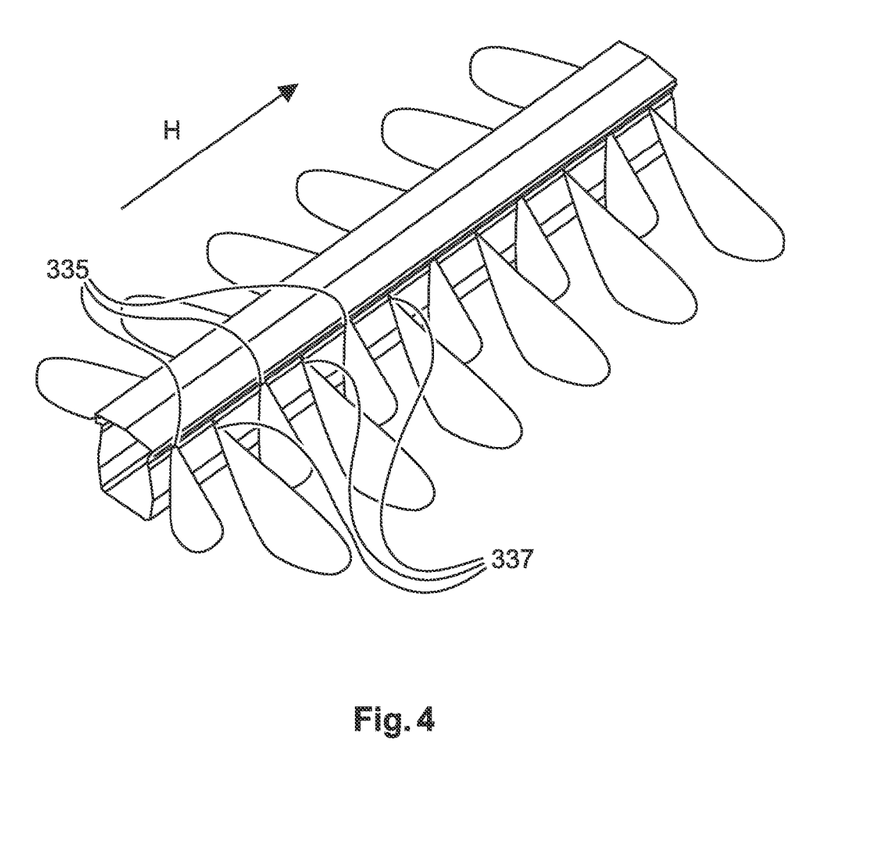
FIG. 4 shows a perspective view of a drying air channel of a cage system according to a fourth preferred embodiment of the invention.

Additionally or alternatively, the drying air may be provided in a different angle of flow direction by the two sets of openings on each side of the drying air channel. This is shown in FIG. 3 wherein each opening 234, 235, 236, 237 provides the drying air in a preset angle but said angle is different for the openings 234 of the first set and the openings 236 of the second set in the first side wall 233a. The same applies to the two sets of openings 235, 237 in the second side wall 233b. Each set of openings 234, 236 and 235, 237 in one side wall may preferably extend along a straight line parallel to the direction of extension of the drying air channel, wherein the extension line of the sets of openings may be in a distance from each other as shown in FIG. 3 or no such distance may be present as shown in FIG. 4. The openings may be arranged in such a pattern that two openings of each set of openings lie in a common cross-sectional plane, as shown in FIGS. 2 and 3. Alternatively, the openings may be arranged such that a staggered positioning in relation to the horizontal direction of extension H is realized, wherein the openings 337 of the second set are arranged in a distance in longitudinal direction from the openings 335 of the first set as shown in FIGS. 1 and 4.

The preferably two of sets of openings are preferably extended periodically with a certain distance to each other in longitudinal direction so that an overlay of the air flows is excluded, as shown in FIG. 4. This arrangement provides efficient drying of the manure and allows the drying of wide manure collecting bands with only one single central air channel. By providing different diameters of the drilled or stamped openings in the set of openings, the air velocity as well as the air volume can be adapted to the amount of manure and therefore the required degree of dryness.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. A poultry cage comprising:
a resting surface in a horizontal plane, said resting surface having a plurality of openings;
a manure collecting surface arranged underneath said resting surface; wherein said manure collecting surface is the upper face of a manure conveying belt extending in a longitudinal direction, and
a drying air channel extending in said longitudinal direction, wherein the drying air channel having a cross-section which has a first horizontal width in an upper portion and a second horizontal width in a lower portion, wherein said first horizontal width is larger than said second horizontal width, wherein said drying air channel comprises a top wall, a bottom wall and a first and a second side wall defining an inner space for conveying drying air, said inner space having a substantially quadrilateral cross-section, and wherein said first side wall comprises a set of first openings directing drying air out of said inner space towards said manure collecting surface and a set of second openings directing drying air out of said inner space towards said manure collecting surface, wherein said first openings are arranged in said upper portion and said second openings are arranged in said lower portion;
wherein each first openings directing the drying air at a first angle against a vertical direction towards the manure collecting surface and each second openings directing the drying air at a second angle against a vertical direction towards the manure collecting surface, said first angle being different than the second angle.

2. The poultry cage according to claim 1, wherein the drying air channel extends along the middle line of the poultry cage and the resting surface comprises a first surface portion arranged on a first side of the drying air channel and a second surface portion arranged on an opposite side of the drying air channel, the manure collecting surface comprising a first surface portion arranged on one side of the drying air channel and a second surface portion arranged on another side of the drying air channel, respectively, and wherein the said second side wall comprises a set of first openings and a set of second openings arranged in the same pattern as the set of first and second openings in said first side wall.

3. The poultry cage according to claim 1, wherein said drying air channel is arranged below said resting surface.

4. The poultry cage according to claim 3, wherein each of said first openings is arranged in a distance of less than four centimeters below said resting surface.

5. The poultry cage according to claim 3, wherein each of said first and second openings is arranged in a distance of less than four centimeters below said resting surface.

6. The poultry cage according to claim 1, wherein said drying air channel is a hollow plastic profile member.

7. The poultry cage according to claim 1, wherein said first openings are arranged along a first line extending in said longitudinal direction.

8. The poultry cage according to claim 7, wherein said second openings are arranged along a second line extending in said longitudinal direction, said second line being distanced from said first line.

9. The poultry cage according to claim 1, wherein an upper surface of said top wall forms a part of the resting surface.

10. A poultry cage, comprising:
a resting surface in a horizontal plane, said resting surface having a plurality of openings;
a manure collecting surface arranged underneath said resting surface; wherein said manure collecting surface is the upper face of a manure conveying belt extending in a longitudinal direction, and
a drying air channel extending in said longitudinal direction, wherein the drying air channel having a cross-section which has a first horizontal width in an upper portion and a second horizontal width in a lower portion, wherein said first horizontal width is larger than said second horizontal width, wherein said drying air channel comprises a top wall, a bottom wall and a first and a second side wall defining an inner space for conveying drying air, said inner space having a substantially quadrilateral cross-section,
and wherein said first side wall comprises a set of first openings, said first openings directing drying air out of said inner space towards said manure collecting surface, and a set of second openings, said second openings directing drying air out of said inner space towards said manure collecting surface, wherein said first openings are arranged in said upper portion and said second openings are arranged in said lower portion,
wherein the set of first openings directs the drying air to a first surface region of said manure collecting surface, said first region comprising one or a plurality of surface sections arranged along a line extending in said longitudinal direction and being arranged in a first distance to the drying air channel, and the set of second openings directs the drying air to a second surface region of said manure collecting surface, said second region comprising one or a plurality of second surface sections arranged along a line extending in said longitudinal direction and being arranged in a second distance to the drying air channel, and wherein said first distance is different from said second distance.

11. A poultry cage comprising:
a resting surface in a horizontal plane, said resting surface having a plurality of openings;
a manure collecting surface comprising an upper face of a manure conveying belt extending in a longitudinal direction and arranged underneath said resting surface; and
a drying air channel disposed below said resting surface and extending in said longitudinal direction, the drying air channel having a cross section which has a first horizontal width in an upper portion and a second horizontal width in a lower portion, wherein said first horizontal width is larger than said second horizontal width, the drying air channel comprising a top wall, a bottom wall and a first and a second side wall defining an inner space for conveying drying air, said inner space having a substantially quadrilateral cross-section, and an upper surface of said top wall forming a part of the resting surface, wherein said first side wall comprises a set of first openings directing drying air out of said inner space towards said manure collecting surface, and a set of second openings directing drying air out of said inner space towards said manure collecting surface, each first opening directing the drying air at a first angle against a vertical direction towards the manure collecting surface and each second opening directing the drying air at a second angle against a vertical direction towards the manure collecting surface, said first angle being different from that second angle, wherein each of said first openings is arranged in a distance of less than four centimeters below said resting surface, and wherein said first openings are arranged in said upper portion and said second openings are arranged in said lower portion, and said first openings being arranged along a first line extending in said longitudinal direction and said second openings being arranged along a second line extending in said longitudinal direction, said second line being distanced from said first line.

12. A poultry cage comprising:

a resting surface in a horizontal plane, said resting surface having a plurality of openings;

a manure collecting surface arranged underneath said resting surface, the manure collecting surface comprising the upper face of a manure conveying belt extending in a longitudinal direction; and a drying air channel disposed below said resting surface and extending in said longitudinal direction, wherein said drying air channel comprises a top wall, a bottom wall and a first and a second side wall defining an inner space for conveying drying air, said inner space having a substantially quadrilateral cross-section, and said drying air channel having a cross section which has a first horizontal width in an upper portion and a second horizontal width in a lower portion, wherein said first horizontal width is larger than said second horizontal width, and an upper surface of said top wall forms a part of the resting surface, said first side wall comprising a set of first openings directing drying air out of said inner space towards said manure collecting surface and a set of second openings directing drying air out of said inner space towards said manure collecting surface, the set of first openings directing the drying air to a first surface region of said manure collecting surface, said first region comprising one or a plurality of first surface sections arranged along a line extending in said longitudinal direction and being arranged in a first distance to the drying air channel, and the set of second openings directing the drying air to a second surface region of said manure collecting surface, said second region comprising one or a plurality of second surface sections arranged along a line extending in said longitudinal direction and being arranged in a second distance to the drying air channel, wherein said first distance is different from said second distance, and each of said first openings is arranged in a distance of less than four centimeters below said resting surface, and wherein said second openings are arranged in said lower portion and said first openings are arranged in said upper portion along a first line extending in said longitudinal direction, and said second openings are arranged along a second line extending in said longitudinal direction, said second line being distanced from said first line.

13. The poultry cage according to claim 12, wherein the openings of one set of said sets is smaller than the openings of the other set of said sets.

14. The poultry cage according to claim 12, wherein the openings of one set are distributed in a distance from each other which is identical for each two openings being adjacent to each other, and the openings of the other set are arranged in a distance from each other which is identical for each two openings adjacent to each other, and wherein the distance between the openings of the two sets is identical.

* * * * *